US009213825B1

(12) United States Patent
Gysin et al.

(10) Patent No.: US 9,213,825 B1
(45) Date of Patent: Dec. 15, 2015

(54) USER AUTHENTICATION USING TWO-DIMENSIONAL BARCODES

(71) Applicant: American Megatrends, Inc., Norcross, GA (US)

(72) Inventors: William Gysin, Jefferson, GA (US); Kai Yau, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 14/186,964

(22) Filed: Feb. 21, 2014

(51) Int. Cl.
*G06F 21/36* (2013.01)
*G06F 21/35* (2013.01)
*G06F 21/30* (2013.01)

(52) U.S. Cl.
CPC ............ *G06F 21/36* (2013.01); *G06F 21/30* (2013.01); *G06F 21/35* (2013.01)

(58) Field of Classification Search
CPC .......... G06F 21/30; G06F 21/35; G06F 21/36
See application file for complete search history.

(56) References Cited

U.S. PATENT DOCUMENTS

| | | | | |
|---|---|---|---|---|
| 8,261,089 | B2* | 9/2012 | Leon Cobos et al. | 713/185 |
| 8,272,038 | B2* | 9/2012 | Husemann et al. | 726/3 |
| 8,627,438 | B1 | 1/2014 | Bhimanaik | 726/9 |
| 8,887,262 | B1* | 11/2014 | Turner et al. | 726/10 |
| 8,904,507 | B2* | 12/2014 | Maity | 726/7 |
| 2004/0003258 | A1* | 1/2004 | Billingsley et al. | 713/182 |
| 2010/0315200 | A1* | 12/2010 | Warrier | 340/5.51 |
| 2012/0084846 | A1* | 4/2012 | Weis et al. | 726/6 |
| 2012/0138679 | A1* | 6/2012 | Doyle | 235/380 |
| 2013/0031623 | A1* | 1/2013 | Sanders | 726/19 |
| 2013/0145446 | A1* | 6/2013 | Dorso et al. | 726/6 |
| 2013/0185815 | A1* | 7/2013 | Leotsarakos | 726/30 |
| 2013/0219479 | A1* | 8/2013 | DeSoto et al. | 726/6 |
| 2014/0136828 | A1* | 5/2014 | Lewis et al. | 713/2 |
| 2014/0173695 | A1* | 6/2014 | Valdivia | 726/4 |
| 2014/0230019 | A1* | 8/2014 | Civelli et al. | 726/4 |
| 2014/0230039 | A1* | 8/2014 | Prakash et al. | 726/9 |

OTHER PUBLICATIONS

Adam Howard. Dissertation on the use of QR codes for authentication, witnessed by the Internet Archive on Nov. 26, 2013 (75 pages) http://web.archive.org/web/20131126093935/http://files.skatty.me/FYP.pdf.*
Jan Michielsen. "tiqr user manual" Version 1.0, May 2011 (12 pages) https://tiqr.org/wp-content/uploads/2011/05/tiqr_manual_v1.0.pdf.*
Steve Gibson. "SQRL Secure Login" Last modified Oct. 2, 2013 (4 pages) © 2013 Gibson Research Corp. http://web.archive.org/web/20131003055846/https://www.grc.com/sqrl/sqrl.htm.*

(Continued)

*Primary Examiner* — Joseph P Hirl
*Assistant Examiner* — Thomas Gyorfi
(74) *Attorney, Agent, or Firm* — Lee & Hayes, PLLC

(57) ABSTRACT

A login interface provided by a firmware setup utility is configured to display a two-dimensional barcode, such as a quick response ("QR") code. The barcode is scanned by a mobile device configured to retrieve a timestamp encrypted within the barcode. The mobile device creates a passcode by re-encrypting the timestamp using a firmware setup password and a master key. The passcode is provided to the firmware setup utility, which retrieves the timestamp and compares it to a stored timestamp. If the timestamp values match, access to the firmware setup utility is permitted.

20 Claims, 6 Drawing Sheets

(56) References Cited

OTHER PUBLICATIONS

David Pinto Maestre. "QRP: An improved secure authentication method using QR codes" Jun. 8, 2012 (11 pages) https://www.grc.com/sqrl/files/QRP-secure-authentication.pdf.*

Dipika Sonawane et al. "QR Based Advanced Authentication for all Hardware Platforms" International Journal of Scientific and Research Publications, vol. 4, Issue 1, Jan. 2014 (4 pages) http://www.ijsrp.org/research-paper-0114/ijsrp-p25111.pdf.*

Soonduck Yoo et al. "An effective Two Factor Authentication Method using QR Code" © 2013 SERSC, ISA 2013, ASTL vol. 21, (pp. 106-109) http://onlinepresent.org/proceedings/vol21_2013/27.pdf.*

Thomas Pomin et al. "What is this QR Authentication Scheme called?" article from Sep. 2013 (3 pages) http://security.stackexchange.com/questions/42692/what-is-this-qr-code-authentication-scheme-called.*

Eismann O'Reilly. "QR Codes for Authentication—Real Life Example" Published Oct. 17, 2011 (4 pages) https://qrworld.wordpress.com/2011/10/17/qr-codes-for-authentication-%E2%80%93real-life-example/.*

* cited by examiner

USER AUTHENTICATION USING TWO-DIMENSIONAL BARCODES

BACKGROUND

Most computing systems utilize firmware to control their low-level operation. A firmware setup utility is commonly utilized to access and change system parameters that are controlled by the firmware. Access to the firmware setup utility may be protected by a password. Passwords, however, may be stolen or otherwise compromised, thereby allowing an unauthorized user access to the firmware setup utility.

It is with respect to these and other considerations that the disclosure presented herein has been made.

SUMMARY

Technologies are provided herein for user authentication using two-dimensional barcodes. In particular, through an implementation of the concepts and technologies presented herein, a user may securely login to the firmware setup utility of a computer utilizing a mobile device. This may provide greater security than can be enabled with a simple password, which may be stolen or otherwise compromised.

According to one embodiment described herein a computer may display a two-dimensional barcode that encodes an encrypted timestamp. A mobile device may scan the two-dimensional barcode and retrieve the timestamp. The mobile device may create a passcode by encrypting the timestamp using pre-exchanged keys, such as a firmware setup password and a master key. The passcode may be provided to the computer, which decrypts the passcode to retrieve the timestamp and data indicating boot permissions. Access to the firmware setup utility can be controlled by comparing the original timestamp to the retrieved timestamp and determining whether the values match. In some embodiments, the keys utilized to encrypt and decrypt values may be synchronized between the computer and the mobile device prior to beginning the authentication process described above.

It should be appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for user authentication using two-dimensional barcodes. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments disclosed herein.

Figure 1:
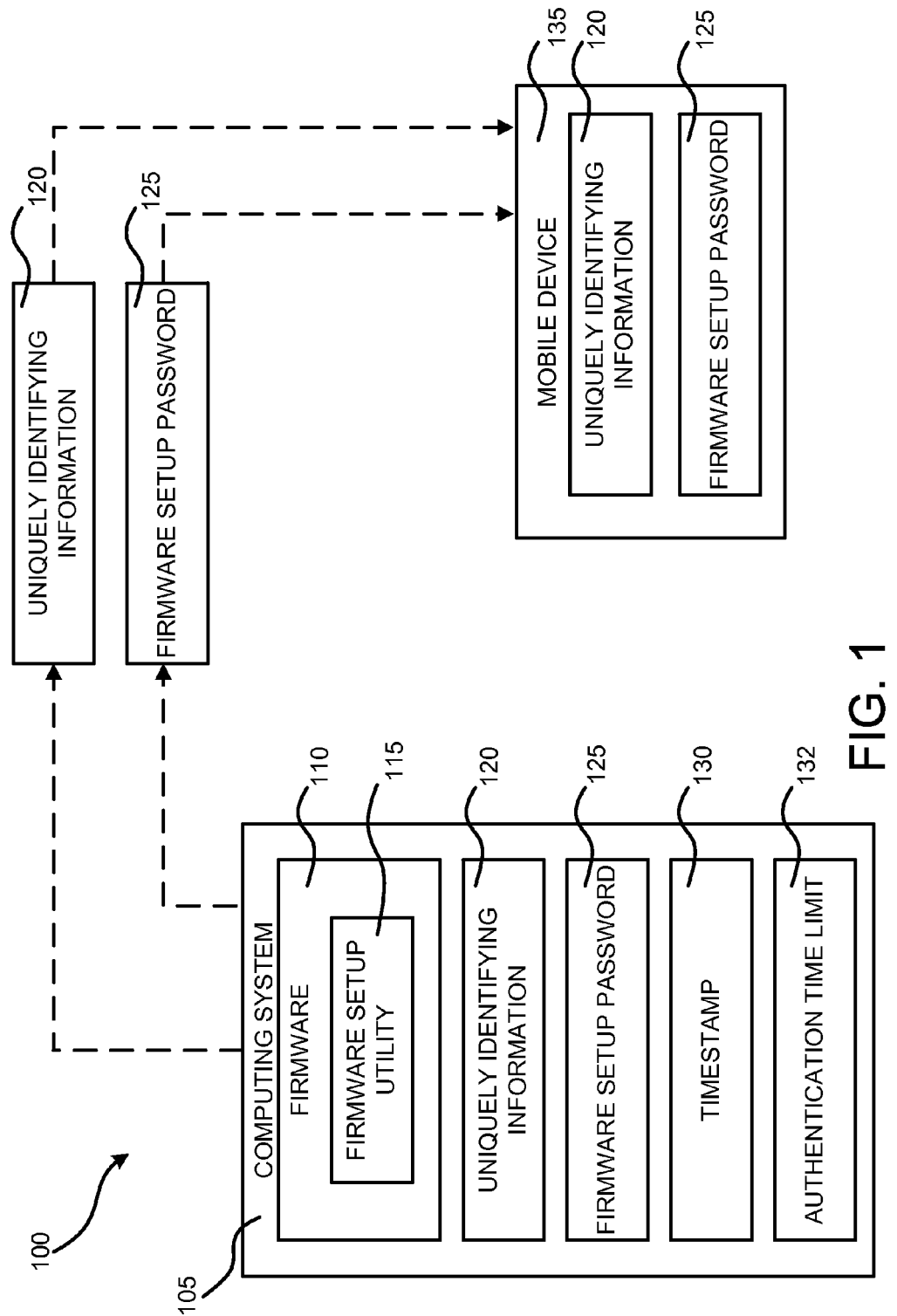
FIG. 1 is a system diagram showing aspects one mechanism disclosed herein for user authentication using two-dimensional bar codes.

Referring now to FIG. 1, a system diagram showing aspects of an illustrative operating environment 100 for various embodiments of the concepts and technologies disclosed herein will be described. The operating environment 100 shown in FIG. 1 includes a computing system 105. The computing system 105 may be a server computer, a personal computer ("PC") such as a desktop workstation, a laptop, or a notebook, a personal digital assistant ("PDA"), a wireless telephone, a set-top box, a gaming console, or any other type of computing system that allows user access to configurable settings in the firmware 110.

The computing system 105 may execute a firmware 110. As discussed briefly above, the firmware 110 is utilized to control the low-level operation of the computing system 105. For instance, and without limitation, the firmware 110 may comprise a basic input/output system ("BIOS") firmware, an extensible firmware interface ("EFI") compatible firmware, or another type of firmware. The firmware 110 may provide a firmware setup utility 115. The firmware setup utility 115 typically provides an interface for displaying information regarding the configuration of the computing system 105, and for making changes to the configuration of the computing system 105. The firmware 110 may also contain executable program code for authenticating user access to the firmware setup utility 115 in the manner disclosed herein.

In some embodiments, the computing system 105 stores uniquely identifying information 120 that uniquely identifies the computing system 105. The uniquely identifying information 120 may be a firmware identifier ("ID"), a read only memory ("ROM") ID, a media access control ("MAC") address, or any other data that uniquely identifies the computing system 105. In some embodiments, a master key may provide additional data useful in distinguishing the hardware of the computing system 105. The master key, for example, might uniquely identify a manufacturer of the computing system 105.

The computing system 105 might also store a firmware setup password 125. The firmware setup password 125 may be any combination of alphanumeric and other characters. The firmware setup password 125 may be set by a user through the firmware setup utility 115. Once the firmware setup password 125 has been set, authentication will be required in order to boot the computing system 105 or to access the functionality provided by the firmware setup utility 115.

In some embodiments, the computing system 105 might also store a timestamp 130. The timestamp 130 may be used to store the value of the system clock at a given point in time, such as upon receiving a request to access the firmware setup utility 115. The timestamp 130 can be rounded up or down to the nearest minute, second, millisecond or other unit of time.

According to various implementations, the computing system 105 may store an authentication time limit 132. The authentication time limit 132 may store a value that indicates a length of time during which the timestamp 130 will remain valid for authentication purposes. The authentication time limit 132 may be configured through the firmware setup utility 115.

The operating environment 100 shown in FIG. 1 might also include a mobile device 135, such as a smartphone or tablet computing device. The mobile device 135 may be configured with a camera and optical recognition software. Information may be exchanged between the mobile device 135 and the computing system 105. The exchange of information may occur through a TCP/IP connection, USB connection, manual entry, and/or through the camera by way of optical recognition of symbols. The information exchanged between the computing system 105 and the mobile device 135 may include the uniquely identifying information 120 and the firmware setup password 125.

Figure 2:
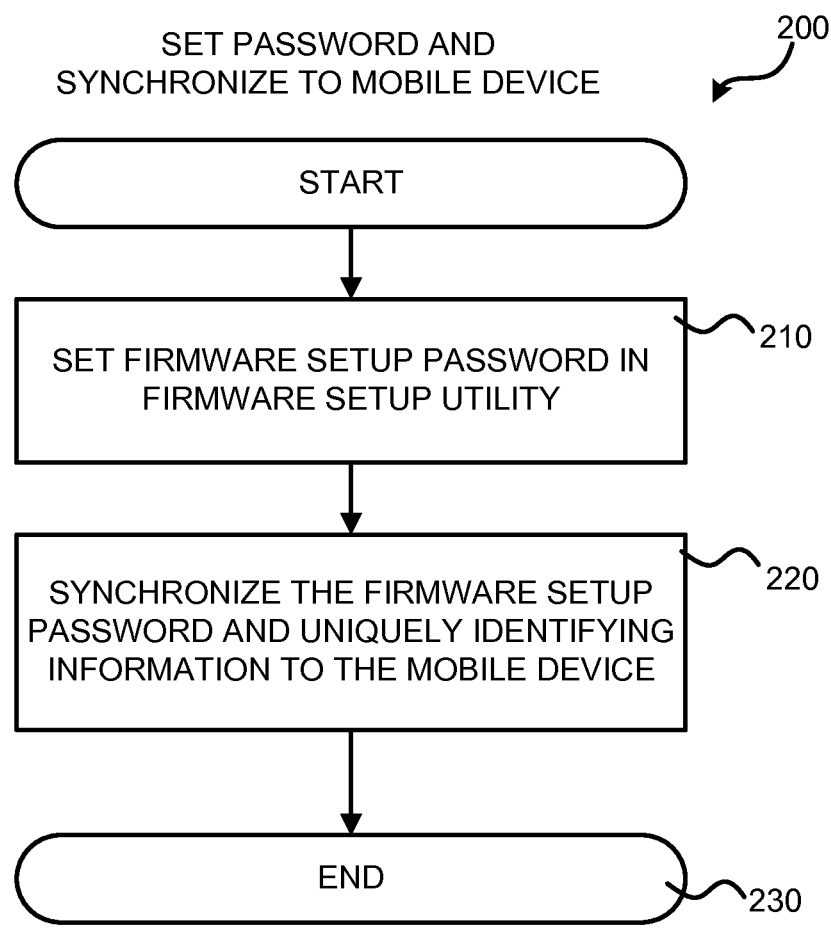
FIG. 2 is flow diagram showing one illustrative routine for setting a firmware password and synchronizing to a mobile device.

Referring now to FIG. 2, additional details will be provided regarding the embodiments presented herein. In particular, FIG. 2 is a flow diagram that illustrates a routine 200 for setting a firmware password 125 and synchronizing the firmware password 125 to the mobile device 135. The routine 200 begins at operation 210, where a firmware setup password 125 may be set through the firmware setup utility 115 and stored on the computing system 105.

The routine 200 then proceeds from operation 210 to operation 220, where the uniquely identifying information 120 and the firmware setup password 125 are synchronized from the computing system 105 to the mobile device 135. The master key described above might also be synchronized from the computing system 105 to the mobile device 135 at operation 220. As mentioned above, synchronization may occur manually (i.e. by a user typing the information into the mobile device 135), through a TCP/IP or universal serial bus ("USB") connection between the computing system 150 and the mobile device 135, or through another type of connection. Once the data has been synchronized to the mobile device 135, the routine 200 proceeds to operation 230, where it ends.

Figure 3:
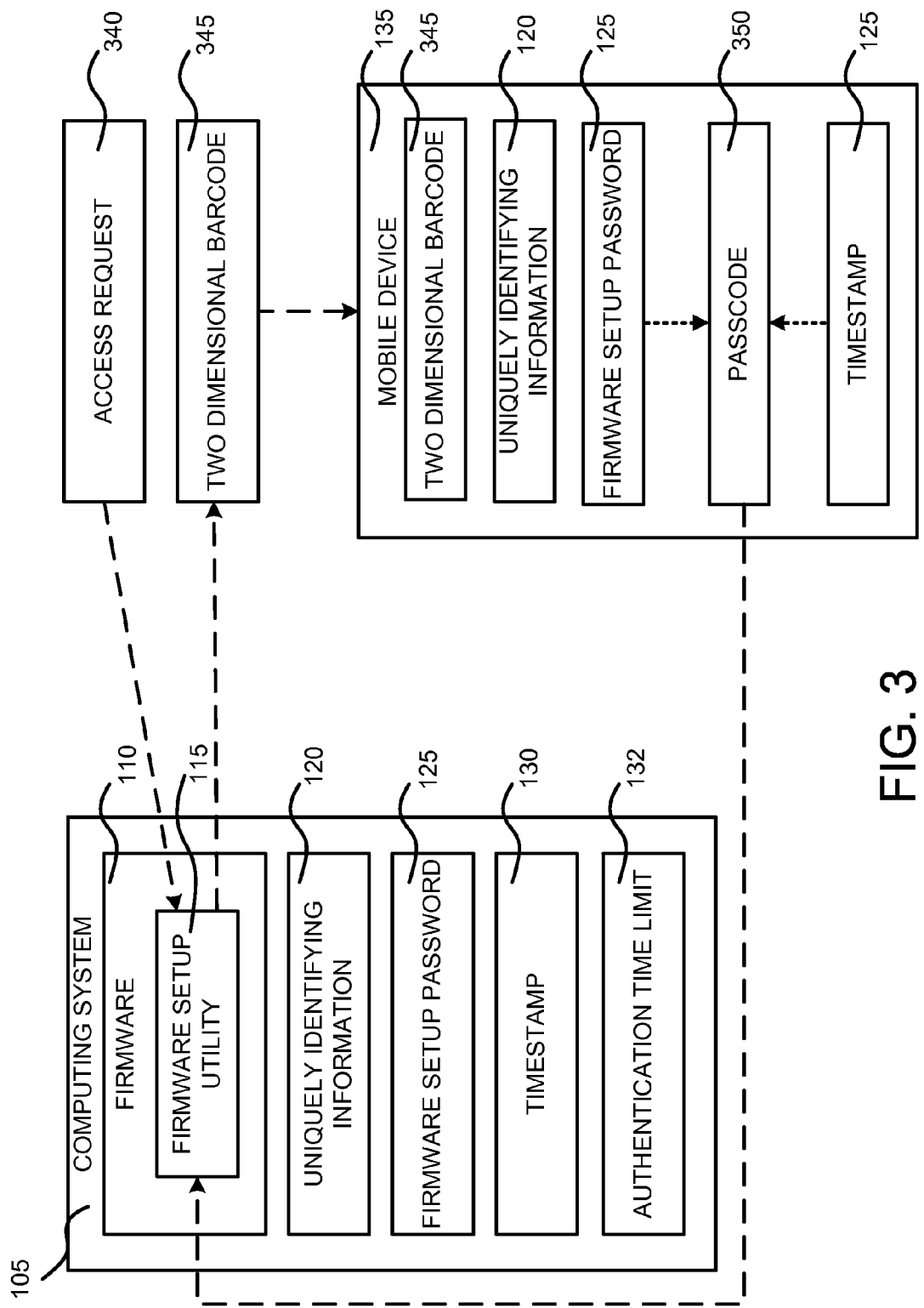
FIG. 3 is a system diagram showing aspects of a system for securely authenticating a user using two-dimensional barcodes according to one embodiment disclosed herein.

Referring now to FIG. 3, additional aspects of one system disclosed herein for securely authenticating a user utilizing two-dimensional barcodes will be described. As shown in FIG. 3, the firmware setup utility 115 may receive an access request 340. For example, a hotkey, which may be a key press or a combination of key presses, may be used to invoke the firmware setup utility 115. A user might attempt to access the firmware setup utility 115 utilizing a mouse connected to the computing system 105. A user might also attempt to access the firmware setup utility 115 in other ways using other types of input devices.

Upon receiving the access request 340, the firmware setup utility 115 may initiate the authentication process described prior to allowing a user access the functionality provided by the firmware setup utility 115. As described in detail below, the authentication process authenticates a user by exchanging encrypted data between the computing system 105 and the mobile device 135.

In some embodiments, the encrypted data exchanged between the firmware setup utility 115 and the mobile device 135 is a token. The token may be created by encrypting the timestamp 130 using the uniquely identifying information 120. The token may be transmitted to the mobile device 135 using a two-dimensional barcode 345. A two-dimensional barcode 345 may take character data as input, and produce a two-dimensional array of dots as a visual representation of the input. In some embodiments, the firmware setup utility 115 may create a two-dimensional barcode 345 that encodes the token for transmission to the mobile device 135. The two-dimensional barcode 345 may be a quick response ("QR") code, an AZTEC code, a DATA MATRIX code, or any other type of two-dimensional barcode that can be utilized to encode a token in the manner described above. The firmware 110 or firmware setup utility 115 may contain code to produce a two-dimensional barcode 345, such as a QR code, from the token, and store the resulting visual representation in a memory buffer accessible by the firmware setup utility 115. The firmware setup utility 115 may show the QR code, or other two-dimensional barcode, by reading from the memory buffer and outputting the visual representation to the display.

In order to read the two dimensional barcode 345, the mobile device 135 may scan the two-dimensional barcode 345 with an integrated camera. Optical recognition ("OCR") software on the mobile device 135 may decode the two-dimensional barcode 345 to extract the token encoded therein. The token may be decrypted using the uniquely identifying information 345 previously provided to the mobile device 135 to obtain the time stamp 130.

In some embodiments, the mobile device 135 creates a passcode 350 by encrypting the timestamp 130 using the firmware setup password 125 that was previously synchronized between the computer system 105 and the mobile device 135. In some embodiments, the passcode 350 is created by encrypting the timestamp 130 using the firmware setup password 125 and the master key. In other embodiments, information in addition to the timestamp 130 might also be encrypted when creating the passcode 350. For example, the passcode 350 can encrypt data identifying a group membership role for the user (e.g., administrator, manager, or user). The passcode 350 may also encrypt data identifying permissions that control a user's ability to boot the computing system 105 (e.g., no boot permissions, permission to boot from one pre-specified device, permission to boot from a USB key, or permission to boot from any device attached to the computing system 105).

The mobile device 135 might also be configured to provide the passcode 350 to the computing system 105. In some embodiments, the passcode 350 may be provided by a TCP/IP or USB connection. The passcode 350 might also be provided manually by the user (i.e. by typing the passcode 350 into the computing system 105). The passcode 350 may be received at the computer system 105 by the firmware setup utility 115. The passcode 350 may then be decrypted using the firmware setup password 125. In some embodiments, the passcode 350 may be decrypted using a combination of the firmware setup password 125 and the master key. Once decrypted, the timestamp 130 may be retrieved from the passcode 350. Additional data, such as user permissions or user roles, might also be retrieved from the decrypted passcode 350 if encoded therein.

In some embodiments, data specifying user permissions and/or roles may be used to control access to functionality governed by the firmware 110. The firmware may grant or deny the ability to allow the computing system 105 to be booted only from one specified device, from a USB drive, or from a selection of devices depending on the value of the user permissions and/or the user roles.

The timestamp 130 retrieved from the passcode 350 is then compared with the timestamp 130 stored previously on the computing system 105 when the access request 340 was received. Upon determining that the values match, access to the firmware setup utility 115 may be permitted. Access to the firmware setup utility 115 is not permitted if the values to not match.

In some embodiments, additional security may be achieved by using the authentication time limit 132 discussed above. In particular, the authentication time limit 132 may be used to store a value signifying the amount of time during which the authentication process described above must be completed.

Figure 4:
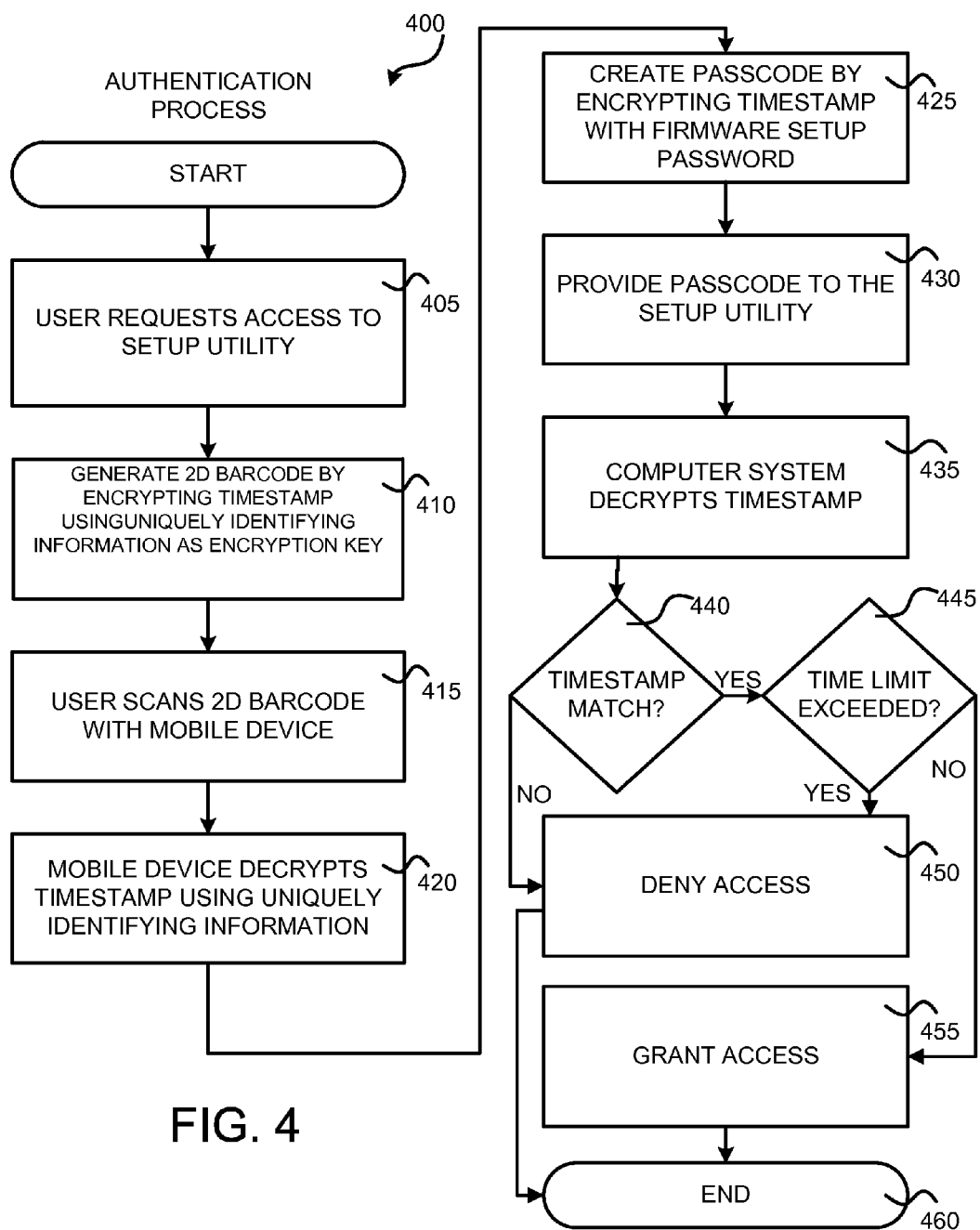
FIG. 4 is a flow diagram showing aspects of a routine disclosed herein for securely authenticating a user using two-dimensional barcodes.

Referring now to FIG. 4, a routine 400 for securely authenticating a user using two-dimensional barcodes will be described. The routine 400 begins at operation 405 where a user requests access to the firmware setup utility 115. An access request 340 may be received at the firmware setup utility 115. The access request 340 may be received over a USB or TCP/IP connection or through a user interface provided by the firmware 110. Upon receiving the access request 340, the firmware setup utility 115 creates the timestamp 130 from the current system time.

From operation 405, the routine 400 proceeds to operation 410, where the firmware setup utility 115 generates a two-dimensional barcode 345. As discussed above, the two-dimensional barcode 345 encodes a token created by encrypting the timestamp 130 using the uniquely identifying information 345. The firmware setup utility 115 may display the two-dimensional barcode 345 on a display for scanning by the mobile device 135. The routine 400 then proceeds from operation 410 to operation 415.

At operation 415, a user may scan the two-dimensional barcode 345 using the mobile device 135. The routine 400 then proceeds from operation 415 to operation 420, where OCR software executing on the mobile device 135 can be used to decode the token from the two-dimensional barcode 345. The mobile device 135 may decrypt the token, using the firmware setup password 125, to retrieve the timestamp 130. The routine 400 then proceeds to operation 425.

At operation 425, the mobile device 135 creates a passcode 350 by encrypting the timestamp 130 with the firmware setup password 125. In some embodiments, and as discussed above, the passcode 350 may be created by encrypting the timestamp 130 with the firmware setup password 125 and the master key. In addition to the timestamp 130, other data, such as user permissions or user roles, may be encrypted in the passcode 350. From operation 425, the routine 400 proceeds to operation 430.

At operation 430, the passcode 350 is provided to the firmware setup utility 115. According to various implementations, the passcode can be provided by TCP/IP connection, USB connection, or manually through a user interface provided by the firmware setup utility 115.

The routine 400 then proceeds from operation 430 to operation 435, where the computing system 105 decrypts the passcode 350 to retrieve the timestamp 130 using the firmware setup password 125. In some embodiments, the passcode 350 may be decrypted using the firmware setup password 125 and the master key. In some embodiments, additional data, such as user permissions and user roles may be retrieved from the decrypted passcode 350. The routine 400 then proceeds to operation 440.

At operation 440, the value of the retrieved timestamp 130 is compared to the value of the previously stored timestamp 130. In response to determining that the values do not match, the routine 400 proceeds from operation 440 to operation 450 where access to the firmware setup utility 115 may be denied. From operation 450, the routine 400 proceeds to operation 460 where it ends.

In response to determining that the value of the retrieved timestamp 130 does match the value of the previously stored timestamp 130, in some embodiments, the routine 400 proceeds to operation 445. At operation 445, the value of the retrieved timestamp 130 can be subtracted from the current system time to obtain a difference. If the difference between the current system time and the retrieved timestamp 130 exceeds the value of the authentication time limit 132, the routine may proceed to operation 450 where access to the firmware setup utility 115 may be denied. Alternatively, if the difference is less than or equal to the authentication time limit 132, the routine 400 may proceed to operation 455.

At operation 455, access to the firmware setup utility 115 may be granted. In some embodiments, additional data retrieved from the decrypted passcode 350 may be used to determine group membership roles and boot permissions for a given user. From operation 455, the routine 400 proceeds to operation 460 where the routine ends.

In some embodiments, the firmware 110 may perform user authentication without invoking the firmware setup utility 115. For example, once a firmware setup password 125 has been set, the computing system 105 may be prevented from booting until a user has been authenticated. The firmware setup utility 115 may be used to enable or disable a setting that controls whether authentication is required prior to booting the computing system 105.

For example, the firmware setup utility 115 may be used to enable or disable a boot restriction setting that controls whether authentication is required prior to booting the computing system 105. If the boot restriction setting is enabled, the firmware 110 may determine if a firmware setup password 125 has been set. In various embodiments, if the firmware 110 determines that the firmware setup password 125 has been set, authentication may be required prior to the firmware 110 proceeding to boot the computing system 105. If the firmware 110 determines that the firmware setup password 125 has not been set, authentication may not be required prior to booting the computing system 105. An example of the operation of an enabled boot restriction setting will now be described.

Figure 5:
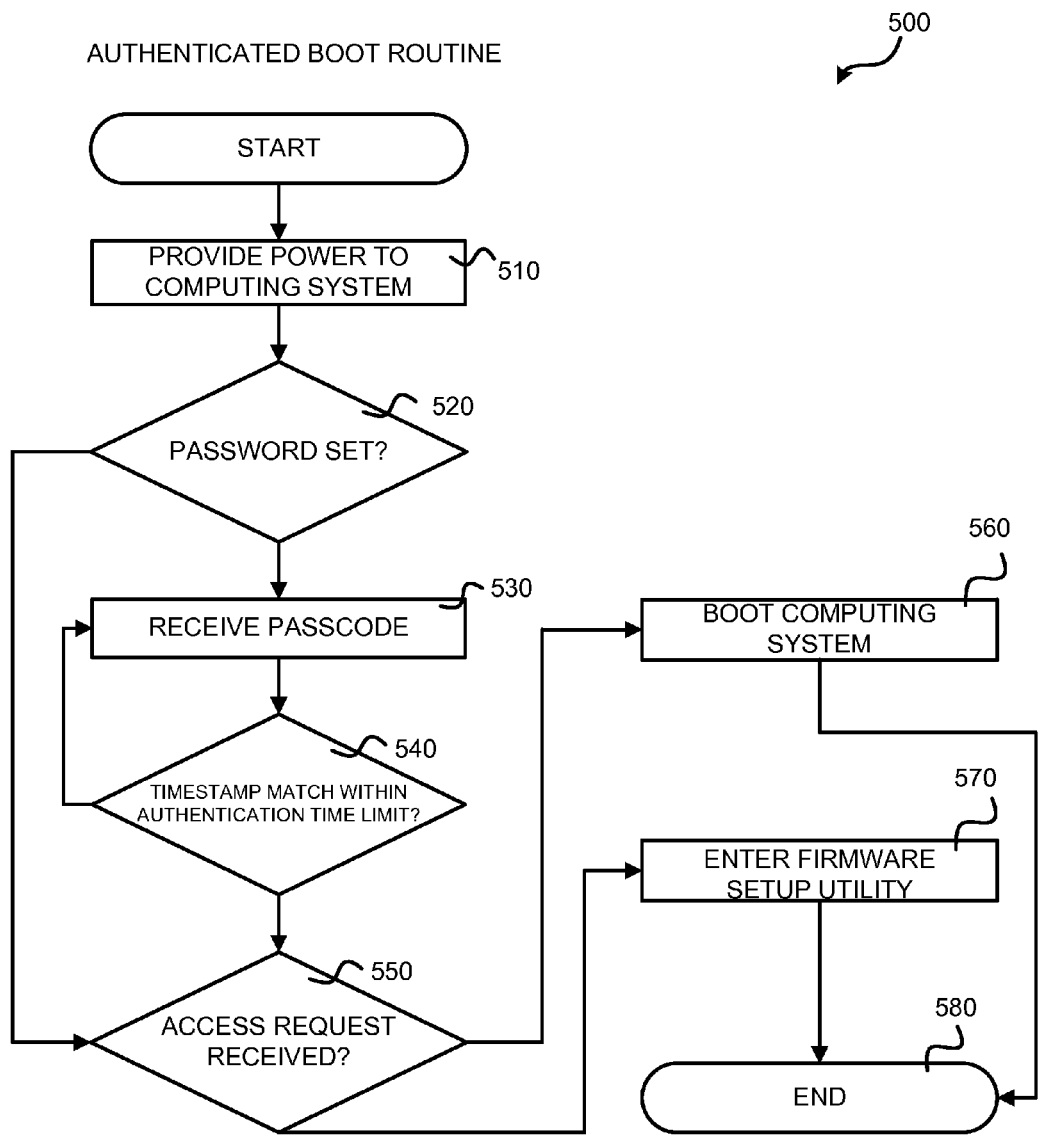
FIG. 5 is a flow diagram showing an illustrative embodiment of an authenticated boot routine.

FIG. 5 is a flow diagram showing an illustrative embodiment of an authenticated boot routine 500. The routine 500 starts at operation 510 where a user may provide power to the computing system 105. From operation 510, the routine 500 proceeds to operation 520 where the firmware 110 determines whether the firmware setup password 125 has been set. In the illustrative embodiment shown in FIG. 5, if the firmware 110 determines the firmware setup password 125 has been set, the routine 500 may proceed to operation 530.

At operation 530, the two-dimensional barcode is displayed and the passcode 350 is received as described in operations 410 to 430 of FIG. 4. From operation 530, the routine 500 proceeds to operation 540 where the firmware 110 determines whether the timestamp 130 retrieved from the passcode 350 matches the previously stored timestamp 130, and whether the matching occurred prior to the expiration of the authentication time limit 132. Upon determining that a correct match has occurred within the authentication time limit 132, the routine 500 proceeds from operation 540 to operation 550.

From operation 520, if the firmware 110 determines that the firmware setup password 125 has not been set, the routine may proceed to operation 550. At operation 550, the firmware 110 determines whether an access request 340 has been received. If the firmware 110 determines that an access request 340 has been received, the routine 500 may proceed to operation 570 where the firmware setup utility 115 may be executed. If the firmware 110 determines that an access request 340 has not been received, the routine 500 may proceed to operation 560 where the firmware 110 may proceed to boot the computing system 105. From operations 560 and 570, the routine 500 may proceed to operation 580 where the routine 500 ends.

Figure 6:
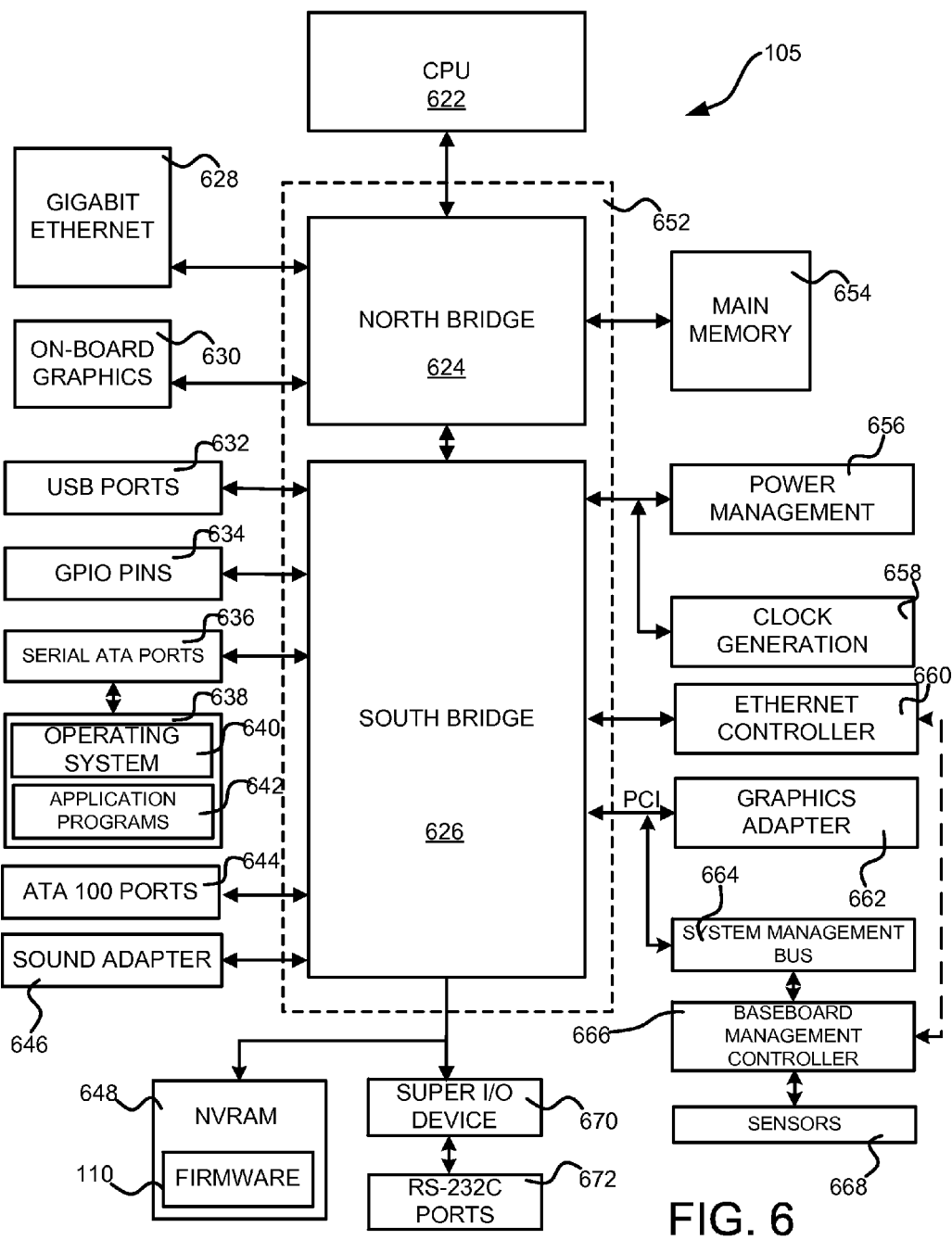
FIG. 6 is a computer architecture diagram showing an illustrative computer architecture that might be utilized to implement a computing system that embodies the various concepts and technologies presented herein.

FIG. 6 is a computer architecture diagram showing an illustrative computer architecture that might be utilized to implement a computing system that embodies the various concepts and technologies presented herein. FIG. 6 and the following discussion are intended to provide a brief, general description of one suitable computing environment in which the embodiments described herein may be implemented. While the technical details are presented herein in the general context of program modules that execute in conjunction with the execution of a firmware 110, those skilled in the art will recognize that the embodiments may also be implemented in combination with other program modules.

Generally, program modules include routines, programs, components, data structures, scripts, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

As discussed briefly above, FIG. 6 shows an illustrative computer architecture that may be utilized to embody a computing system 105 capable of implementing user authentication using two-dimensional barcodes in the manner presented above. The illustrative computer architecture shown in FIG. 6 is for a computing system 105 that includes a baseboard, or "motherboard", which is a printed circuit board to which a multitude of components or devices may be connected by way of a system bus or other electrical communication path. In one illustrative embodiment, a CPU 622 operates in conjunction with a chipset 652. As discussed briefly above, the CPU 622 is a central processor that performs arithmetic and logical operations necessary for the operation of the computer. The computing system 105 may include a multitude of CPUs 622. Each CPU 622 might include multiple processing cores.

The chipset 652 includes a north bridge 624 and a south bridge 626. The north bridge 624 provides an interface between the CPU 102 and the remainder of the computing system 105. The north bridge 624 also provides an interface to a RAM 654 used as the main memory in the computing system 105 and, possibly, to an on-board graphics adapter 630.

The north bridge 624 may also include functionality for providing networking functionality through a gigabit Ethernet adapter 628. The gigabit Ethernet adapter 628 is capable of connecting the computing system 105 to another computer via a network. Connections that may be made by the network adapter 628 may include LAN or WAN connections. LAN and WAN networking environments are commonplace in offices, enterprise-wide computer networks, intranets, and the Internet. The north bridge 624 is connected to the south bridge 626.

The south bridge 626 is responsible for controlling many of the input/output functions of the computing system 105. In particular, the south bridge 626 may provide one or more universal serial bus ("USB") ports 632, a sound adapter 646, an Ethernet controller 660, and one or more general-purpose input/output ("GPIO") pins 634. The south bridge 626 may also provide a bus for interfacing peripheral card devices such as a graphics adapter 662.

The south bridge 626 is also configured to provide one or more interfaces for connecting mass storage devices to the computing system 105. For instance, according to an embodiment, the south bridge 626 includes a serial advanced technology attachment ("SATA") adapter for providing one or more serial ATA ports 636 and an ATA 100 adapter for providing one or more ATA 100 ports 644. The serial ATA ports 636 and the ATA 100 ports 644 may be, in turn, connected to one or more mass storage devices storing an operating system 640 and application programs 642, such as the SATA disk drive 638. As known to those skilled in the art, an operating system 640 comprises a set of programs that control operations of a computer and allocation of resources. An application program 642 is software that runs on top of the operating system 640 software, or other runtime environment, and uses computer resources to perform application specific tasks desired by the user.

The mass storage devices connected to the south bridge 626, and their associated computer-readable media, provide non-volatile storage for the computing system 105. Although the description of computer-readable storage media contained herein refers to a mass storage device, such as a hard disk or CD-ROM drive, it should be appreciated by those skilled in the art that computer-readable media can be any available non-transitory storage media that can be accessed by the computing system 105.

By way of example, and not limitation, computer-readable storage media includes volatile and non-volatile, removable and non-removable media implemented in any method or technology for the non-transitory storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information in a non-transitory fashion, and which can be accessed by the computing system 105.

A low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer-readable media such as a ROM or a flash memory such as the NVRAM 648 for storing a firmware 110 that includes program code containing the basic routines (e.g., a BIOS) that help to start up the computing system 105 and for performing other functions.

It should be appreciated that the software components described herein may, when loaded into the CPU 622 and executed, transform the CPU 622 and the overall computing system 105 from a general-purpose computing system into a special-purpose computing system customized to facilitate the functionality presented herein. The CPU 622 may be constructed from any number of transistors or other discrete circuit elements, which may individually or collectively assume any number of states. More specifically, the CPU 622 may operate as a finite-state machine, in response to executable instructions contained within the software modules disclosed herein. These computer-executable instructions may transform the CPU 622 by specifying how the CPU 622 transitions between states, thereby transforming the transistors or other discrete hardware elements constituting the CPU 622.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing system 105 in order to store and execute the software components presented herein. It also should be appreciated that the computing system 105 may comprise other types of computing devices, including hand-held computers, embedded computer systems, personal digital assistants, and other types of computing devices known to those skilled in the art. It is also contemplated that the computing system 105 may not include all of the components shown in FIG. 6, may include other components that are not explicitly shown in FIG. 6, or may utilize an architecture completely different than that shown in FIG. 6, (e.g., on non-x86 CPU-based platforms, an ARM processor from ARM LIMITED COMPANY in the United Kingdom or other processors may be used).

Based on the foregoing, it should be appreciated that concepts and technologies for user authentication using two-dimensional barcodes have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for securely authenticating a user for a setup utility, the method comprising computer-implemented operations for:
    scanning, from a mobile computing device, a two-dimensional barcode displayed by a computing system executing a firmware setup utility;
    decoding, by the mobile computing device, the two-dimensional barcode to retrieve a timestamp encoded within the barcode;
    creating a passcode, by the mobile computing device, by encrypting the timestamp using a firmware setup password; and
    providing the passcode to the computing system to obtain access to the firmware setup utility if the timestamp matches a previously stored timestamp.

2. The computer-implemented method of claim 1, wherein the two-dimensional barcode is a visual representation of a token generated by encrypting the timestamp using information uniquely identifying the computing system.

3. The computer-implemented method of claim 1, wherein the two-dimensional barcode is a quick response (QR) code.

4. The computer-implemented method of claim 1, wherein decoding the two-dimensional barcode further comprises decrypting a token generated by encrypting the timestamp using information uniquely identifying the computing system.

5. The computer-implemented method of claim 1, wherein creating the passcode by encrypting the timestamp using the firmware setup password further comprises encrypting the timestamp using the firmware setup password and a master key.

6. The computer-implemented method of claim 1, wherein providing the passcode to the computing system further comprises providing the passcode to the computing system over a TCP/IP connection.

7. The computer-implemented method of claim 1, wherein the stored user password is synchronized from the computing system to the mobile computing device.

8. The computer-implemented method of claim 1, further comprising:
    determining whether a difference between a current time and the timestamp exceeds an authentication time limit; and
    denying access to the firmware setup utility upon determining the difference between the current time and the timestamp does exceed the authentication time limit.

9. A system comprising:
    a computer, executing a firmware, the firmware comprising a firmware setup utility, the firmware setup utility configured to display a two-dimensional barcode; and
    a mobile computing device configured to
        scan the two-dimensional barcode,
        decode the two-dimensional barcode to retrieve a timestamp encoded within the two-dimensional barcode, create a passcode by encrypting the timestamp using a firmware setup password, and provide the passcode to the firmware setup utility, and wherein the computer is further configured to receive the passcode created by the mobile computing device, decrypt the passcode using the firmware setup password to retrieve the timestamp, compare the retrieved timestamp to a stored timestamp, and provide access to the firmware setup utility if the retrieved timestamp matches the stored timestamp.

10. The system of claim 9, wherein the two-dimensional barcode is a visual representation of a token generated by encrypting the timestamp using information uniquely identifying the computer.

11. The system of claim 10, wherein the two-dimensional barcode is a quick response (QR) code, and wherein decoding the two-dimensional barcode to retrieve the timestamp further comprises decrypting the token using the information uniquely identifying the computer.

12. The system of claim 9, wherein creating the passcode further comprises creating the passcode by encrypting the timestamp using the firmware setup password and a master key.

13. The system of claim 9, wherein decrypting the passcode using the firmware setup password to retrieve the timestamp further comprises retrieving data identifying permissions that control an ability of a user to boot the computing system.

14. The system of claim 9, wherein the firmware setup password was previously synchronized with the mobile computing device.

15. The system of claim 9, wherein the computer is further configured to determine whether a difference between a current time and the retrieved timestamp exceeds an authentication time limit.

16. The system of claim 15, wherein the computer is further configured to deny access to the firmware setup utility upon determining that the difference between the current time and the retrieved timestamp does exceed the authentication time limit.

17. The system of claim 16, wherein the computer is further configured to permit access to the firmware setup utility upon determining the retrieved timestamp matches the stored timestamp and the difference between the current time and the retrieved timestamp does not exceed the authentication time limit.

18. A non-transitory computer-readable storage medium, having computer-executable instructions stored thereupon which, when executed by a computer, cause the computer to:

create a token by encrypting a timestamp using information uniquely identifying a motherboard;

display a two-dimensional barcode generated from the token;

receive an encrypted passcode, generated by a mobile computing device, comprising the timestamp;

decrypt the passcode to retrieve the timestamp; and upon determining that the retrieved timestamp matches a stored timestamp, allow access to the firmware setup utility.

19. The non-transitory computer-readable storage medium of claim 18, wherein decrypting the passcode to retrieve the timestamp further comprises decrypting the timestamp using a firmware setup password and a master key and wherein allowing access to the firmware setup utility further comprises determining that a difference between a current time and the retrieved timestamp does not exceed an authentication time limit.

20. The non-transitory computer-readable storage medium of claim 18, further comprising computer-executable instructions stored thereupon which, when executed by a computer, cause the computer to execute a firmware setup utility upon receiving an access request.

* * * * *